US008641818B2

(12) United States Patent
Roddy

(10) Patent No.: US 8,641,818 B2
(45) Date of Patent: Feb. 4, 2014

(54) WELL CEMENT COMPOSITIONS COMPRISING BIOWASTE ASH AND METHODS OF USE

(75) Inventor: Craig W. Roddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/418,220

(22) Filed: Mar. 12, 2012

(65) Prior Publication Data

US 2012/0160131 A1 Jun. 28, 2012

Related U.S. Application Data

(62) Division of application No. 12/497,402, filed on Jul. 2, 2009.

(51) Int. Cl.
*C09K 8/46* (2006.01)
(52) U.S. Cl.
USPC ............. 106/705; 106/724; 106/DIG. 1
(58) Field of Classification Search
USPC .................. 106/705, 724, DIG. 1
See application file for complete search history.

(56) References Cited

U.S. PATENT DOCUMENTS

| | | | |
|---|---|---|---|
| 3,335,798 A | 8/1967 | Querio et al. | |
| 3,804,058 A | 4/1974 | Messenger | |
| 3,835,926 A | 9/1974 | Clement, Jr. | |
| 3,902,911 A | 9/1975 | Messenger | |
| 3,928,052 A | 12/1975 | Clement, Jr. | |
| 4,223,733 A | 9/1980 | Bodor et al. | |
| 4,249,954 A * | 2/1981 | Keogh | 106/407 |
| 4,415,367 A | 11/1983 | Nelson | |
| 4,432,666 A * | 2/1984 | Frey et al. | 588/257 |
| 4,540,316 A * | 9/1985 | Takahashi | 405/264 |
| 4,967,839 A | 11/1990 | Carpenter et al. | |
| 4,997,487 A | 3/1991 | Vinson et al. | |
| 5,286,430 A * | 2/1994 | Downs et al. | 264/112 |
| 5,318,382 A | 6/1994 | Cahill | |
| 5,352,288 A * | 10/1994 | Mallow | 106/605 |
| 5,466,407 A * | 11/1995 | Downs et al. | 264/115 |
| 5,518,996 A | 5/1996 | Maroy et al. | |
| 5,897,699 A | 4/1999 | Chatterji et al. | |
| 5,968,254 A * | 10/1999 | Dodgen et al. | 106/705 |
| 6,002,063 A | 12/1999 | Bilak et al. | |
| 6,063,738 A | 5/2000 | Chatterji et al. | |
| 6,367,550 B1 | 4/2002 | Chatterji et al. | |
| 6,547,871 B2 | 4/2003 | Chatterji et al. | |
| 6,797,054 B2 | 9/2004 | Chatterji et al. | |
| 6,962,561 B2 | 11/2005 | Bruno et al. | |
| 7,077,203 B1 | 7/2006 | Roddy et al. | |
| 7,094,737 B1 | 8/2006 | Sampey | |
| 7,137,945 B2 | 11/2006 | Hughes | |
| 7,182,137 B2 | 2/2007 | Fyten et al. | |
| 7,204,307 B2 | 4/2007 | Roddy et al. | |
| 7,213,646 B2 | 5/2007 | Roddy et al. | |
| 7,219,733 B2 | 5/2007 | Luke et al. | |
| 7,229,492 B2 | 6/2007 | Chatterji et al. | |
| 7,303,015 B2 | 12/2007 | Fyten et al. | |
| 7,326,291 B2 | 2/2008 | Fyten et al. | |
| 7,332,026 B2 | 2/2008 | Fyten et al. | |
| 7,335,252 B2 | 2/2008 | Roddy et al. | |
| 7,353,870 B2 | 4/2008 | Roddy et al. | |
| 7,387,675 B2 | 6/2008 | Roddy et al. | |
| 7,395,860 B2 | 7/2008 | Roddy et al. | |
| 7,442,248 B2 | 10/2008 | Timmons | |
| 7,445,699 B2 | 11/2008 | Scheer et al. | |
| 7,491,267 B2 * | 2/2009 | Francis et al. | 106/690 |
| 7,655,088 B2 * | 2/2010 | Bethani | 106/705 |
| 2004/0187740 A1 | 9/2004 | Timmons | |
| 2011/0000400 A1 | 1/2011 | Roddy | |
| 2013/0153214 A1 | 6/2013 | Roddy et al. | |

OTHER PUBLICATIONS

JP 020002477720 A Sakamoto et al. (Sep. 12, 2000) Abstract only.*
"Municipal solid waste bottom ash as portland cement concrete ingredient", Berg et al., Journal of Materials in Civil Engineering (1998), 10(3), p. 168-173. abstract only.*
JP 56115692 A (Ishizuka) Sep. 10, 1981 English Translation.*
"Behavior of dioxins, furans, and metals associated with stabilized MSW combustor ash in sea water", Roethel et al., Chemistry and Ecology (1995), 10(3-4), 259-272. abstract only.*
JP 10088134 A (Sakamaki et al.), Apr. 7, 1998, abstract only.*
Strength enhancement of concrete containing MSW incinerator ash, Cobb et al., Book of Abstracts, 210th ACS Nat'l Meeting, Chicago IL, Aug. 20-24, 1995, Issue Pt. 1 abstract only.*
"Strength enhancement of concrete containing MSW incinerator ash", Cobb et al., Preprints of Papers-American Chemical Society, Division of Fuel Chemistry (1995), 40(4), 853-7. abstract.*
"High-strength portland cement concrete containing municipal solid incinerator ash", Cobb et al., Preprints of Papers-American Chemical Society, Division of Fuel Chemistry (1991), 36(4), 1769-76. abstract.*
"High Strength Portland cement concrete containing municipal solid waste incinerator ash", Cobb et al., ACS Symposium Series (1992), 515 (Clean Energy from Waste and Coal), 264-75. abstract.*
"Long term diffusion of elements from municipal solid waste combustor ash blocks in the marine environment", Breslin et al., Estuarine, Coastal and Shelf Science (1995), 40(3), 249-63. abstract.*
JP 56115692 A (Asahi glass) Sep. 10, 1981 abstract.*
"Use of ashes from municipal solid waste incineration (MSW) in cementitious building materials", Gerdes et al., Studies in Environmental Science (1994), 60(Environmental Aspects of Construction With Waste Materials), 905-8. abstract.*
"Use of ashes from municipal solid waste incineration (MSW) in cementitious building materials", Gerdes et al., Studies in Environmental Science (1994), 60(Environmental Aspects of Construction with Waste Materials), 905-8.*
"Ash from solid household wastes in concretes", Shelegeda et al., Stroitel'nye Materialy i Konstruktsii (1992), (1), 13-14. abstract.*
Cobb et al., Strength Enhancement of Concrete Containing MSW Incinerator Ash, Division of Fuel Chemistry American Chemical Society, vol. 40 No. 4, pp. 853-857, 1995.

(Continued)

*Primary Examiner* — Paul Marcantoni
(74) *Attorney, Agent, or Firm* — Craig W. Roddy; Turney L.L.P.

(57) ABSTRACT

Cement compositions containing biowaste ash and methods of cementing in subterranean formations using such cement compositions. Examples of suitable biowaste ash include agricultural waste ash, municipal waste ash, waste-water treatment waste ash, animal waste ash, non-human-non-animal industrial waste ash, and combinations thereof.

19 Claims, No Drawings

(56) References Cited

OTHER PUBLICATIONS

Cobb et al., High-Strength Portland Cement Concrete Containing Municipal Solid Waste Incinerator Ash, ACS Symposium Series, vol. 515, pp. 1769-1776, 1996.

James A. Kozinski et al., Analysis of Hydrocarbons and Ash from Contaminated Industrial Biowaste Under Combustion-Like Conditions, Eviron. Sci. Technol., vol. 33, pp. 4318-4325, 1999.

Jimmy et al., MSW Incineration Bottom Ash-Based Lightweight Concrete, pp. 1-5, 2003.

Halliburton Brochure entitled "Pozmix® Cement Additive," pp. 1-2, 2007.

Goyal et al., Agricultural Bio Waste Ashes as Alternate Cementitious Material—Strength Evaluation of Partially Blended Cement Mortars. pp. 1-2, 2007.

M. Nazir et al., Waste Ash Pozzolans, http://iirr.ucalgary.ca/files/iirr/waste_ash_slides.pdf, pp. 1-21, Printed from the Internet Jul. 12, 2009.

USPTO Office Action for U.S. Appl. No 2/497,402 dated Feb. 27, 2012.

USPTO Office Action for U.S. Appl. No. 12/497,402 dated Jun. 27, 2012.

USPTO Office Action from U.S. Appl. No. 12/497,402, dated Jul. 2, 2013.

Office Action from U.S. Appl. No. 12/497,402 dated Feb. 7, 2013.

Office Action from U.S. Appl. No. 12/497,402 dated Oct. 25, 2012.

USPTO Office Action from U.S. Appl. No. 12/497,402, dated Nov. 15, 2013.

\* cited by examiner

WELL CEMENT COMPOSITIONS COMPRISING BIOWASTE ASH AND METHODS OF USE

CROSS-REFERENCE TO RELATED APPLICATIONS

The present application is a divisional of U.S. patent application Ser. No. 12/497,402, entitled "Well Cement Compositions Comprising Biowaste Ash and Methods of Use," filed on Jul. 2, 2009, the entire disclosure of which is incorporated herein by reference.

BACKGROUND

The present invention relates to cementing operations and, more particularly, in certain embodiments, to cementing methods and compositions that comprise biowaste ash.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

Cement compositions used heretofore commonly comprise Portland cement, which is generally is a major component of the cost for the cement compositions. To reduce the cost of such cement compositions, other components may be included in the cement composition in addition to, or in place of, the Portland cement. Such components may include fly ash, slag cement, shale, metakaolin, micro-fine cement, cement kiln dust, zeolite, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a cement composition that, when combined with water, may set to form a hardened mass.

Large amounts of biowaste are generated worldwide each year. Biowaste ash can be derived from a number of sources including agricultural waste, municipal waste, waste-water treatment waste, animal waste, non-human-non-animal industrial waste, and combinations thereof. A number of different methods for disposal of biowaste have been developed, including application to surface land, composting, and landfill disposal. In addition, billions of tons of biowaste are burnt every year, resulting in tons of ashes that must be disposed.

SUMMARY

The present invention relates to cementing operations and, more particularly, in certain embodiments, to cementing methods and compositions that comprise biowaste ash.

An embodiment of the present invention provides a method of cementing. The method may comprise introducing a cement composition into a subterranean formation, wherein the cement composition may comprise hydraulic cement, water, and biowaste ash. The method further may comprise allowing the cement composition to set in the subterranean formation.

Another embodiment of the present invention provides a method of cementing. The method may comprise introducing a cement composition into a subterranean formation, wherein the cement composition comprises hydraulic cement, water, biowaste ash, and at least one additive selected from the group consisting of cement kiln dust, fly ash, a natural pozzalon, metakaolin, shale, slag, zeolite, and combinations thereof. The method further may comprise allowing the cement composition to set in the subterranean formation.

Another embodiment of the present invention provides a subterranean formation cementing composition that may comprise hydraulic cement, water, biowaste ash, and at least one additive selected from the group consisting of a strength-retrogression additive, a set accelerator, a set retarder, a weighting agent, a lightweight additive, a gas-generating additive, a mechanical-property-enhancing additive, a lost-circulation material, a filtration-control additive, a dispersant, a fluid loss control additive, a defoaming agent, a foaming agent, a thixotropic additive, an oil-swellable material, a water-swellable material, and combinations thereof.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to cementing methods and compositions that comprise biowaste ash.

There may be several potential advantages to the methods and compositions of the present invention, only some of which may be alluded to herein. One of the many potential advantages of the methods and compositions of the present invention may be that the inclusion of the biowaste ash in embodiments of the cement compositions may reduce the amount of a higher cost additive, such as Portland cement, resulting in a more economical cement composition. Another potential advantage of the methods and compositions of the present invention may be that inclusion of the biowaste ash in embodiments of the cement compositions provides an additional method for the disposal of biowaste. Yet another potential advantage of the methods and compositions of the present invention may be that inclusion of the biowaste ash in embodiments of the cement compositions may enhance mechanical properties of the cement compositions, including, for example, compressive strength.

An embodiment of the cement compositions of the present invention comprises hydraulic cement, water, and biowaste ash. The cement compositions optionally may comprise a number of additional components, including cement kiln dust ("CKD"), fly ash, a natural pozzolan, metakaolin, shale, slag, zeolite, and combinations thereof. In certain embodiments, the cement compositions may be foamed with a gas. Embodiments of the present invention also include methods of cementing that comprise: introducing the cement composition into a subterranean formation; and allowing the cement composition to set in the subterranean formation.

Those of ordinary skill in the art will appreciate that embodiments of the cement compositions generally should have a density suitable for a particular application. By way of example, embodiments of the cement compositions may have a density of about 4 pounds per gallon ("lb/gal") to about 20 lb/gal. In certain embodiments, the cement compositions may have a density of about 8 lb/gal to about 17 lb/gal. In certain embodiments, the cement composition may be a lightweight cement composition having a density of less than or equal to about 13 lb/gal. In other embodiments, the cement compositions may be foamed and have a density of about 4 lb/gal to about 13 lb/gal. Embodiments of the cement compositions may be foamed or unfoamed or may comprise other means to reduce their densities, such as a lightweight additive. Lightweight additives are generally additives that may be included in a cement composition to reduce its density below about 13 lb/gal and may include, for example, bentonite, gilsonite, expanded perlite, and microspheres (e.g., glass spheres). Those of ordinary skill in the art, with the benefit of this disclosure, will recognize the appropriate density for a particular application.

Hydraulic cement is a component that may be included in embodiments of the cement compositions of the present invention. Any of a variety of hydraulic cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in embodiments of the present invention are classified as Class A, C, G and H cements according to American Petroleum Institute, API Specification for Materials and Testing for Well Cements, API Specification 10, Fifth Ed., Jul. 1, 1990. In addition, in some embodiments, hydraulic cements suitable for use in the present invention may include cements classified as ASTM Type I, II, or III.

Where present, the hydraulic cement generally may be included in embodiments of the cement compositions in an amount sufficient to provide, for example, the desired compressive strength, density, and/or cost. In some embodiments, the hydraulic cement may be present in the cement compositions of the present invention in an amount of about 0.01% to about 99% by weight of cementitious components ("bwoc"). In some embodiments, the hydraulic cement may be present in the cement compositions of the present invention in an amount of about 1% to about 95% bwoc. In some embodiments, the hydraulic cement may be present in the cement compositions of the present invention in an amount of about 1% to about 75% bwoc. In some embodiments, the hydraulic cement may be present in the cement compositions of the present invention in an amount of about 1% to about 50% bwoc.

An example of a suitable hydraulic cement comprises a pozzolana cement. In some embodiments, a pozzolana cement that may be suitable for use comprises fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. In some embodiments, lime may be mixed with the fly ash (e.g., Class F fly ash) in an amount of about 0.1% to about 25% by weight of the fly ash. In some instances, the lime may be hydrated lime (calcium hydroxide). Suitable examples of fly ash include, but are not limited to, POZMIX® A cement additive, available from Halliburton Energy Services, Inc., Duncan, Okla. Where present, the fly ash generally may be included in embodiments of the cement compositions in an amount sufficient to provide, for example, the desired compressive strength, density, and/or cost. In some embodiments, the fly ash may be present the cement compositions of the present invention in an amount of about 0.1% to about 75% bwoc. In some embodiments, the fly ash may be present in the cement compositions of the present invention in an amount 1% to about 50% bwoc.

Another example of a suitable hydraulic cement comprises a slag cement. In some embodiments, a slag cement that may be suitable for use may comprise slag. Slag generally does not contain sufficient basic material, so slag cement further may comprise a base to produce a cement composition that may react with water to set to form a hardened mass. Examples of suitable sources of bases include, but are not limited to, sodium hydroxide, sodium bicarbonate, sodium carbonate, lime, and combinations thereof. Where present, the slag cement generally may be included in embodiments of the cement compositions in an amount sufficient to provide, for example, the desired compressive strength, density, and/or cost. In some embodiments, the slag cement may be present in the cement compositions of the present invention in an amount 0.01% to about 99% bwoc. In some embodiments, the slag cement may be present in the cement compositions of the present invention in an amount of about 1% to about 75% bwoc.

The water used in embodiments of the cement compositions of the present invention may include, for example, freshwater, saltwater (e.g., water containing one or more salts dissolved therein), brine (e.g., saturated saltwater produced from subterranean formations), seawater, or combinations thereof. Generally, the water may be from any source, provided, for example, that it does not contain an excess of compounds that may undesirably affect other components in the cement composition. In some embodiments, the water may be included in an amount sufficient to form a pumpable slurry. In some embodiments, the water may be included in the cement compositions of the present invention in an amount of about 40% to about 200% bwoc. In some embodiments, the water may be included in an amount of about 40% to about 150% bwoc.

Biowaste ash is another component that may be included in embodiments of the cement compositions of the present invention. Biowaste ash is generally biowaste that has been burned to produce ash and includes plant- and/or animal-derived waste products. Biowaste ash, as defined herein, does not include fly ash or rice hull ash. As previously described, the biowaste and/or biowaste ash is often disposed of as a waste, but may include any ash that is specifically produced from the sources described herein for use in the various embodiments of the invention. However, in accordance with embodiments of the present invention, the biowaste ash may be used in cementing methods and compositions. In certain embodiments, the ashes produced from the burning of biowaste can be used as a filler material in cementing applications. By way of example, the biowaste may be used to replace higher cost cementitious components, such as Portland cement, resulting in more economical cement compositions. In addition, biowaste ashes can contain large amounts of silica which can form the basis of a pozzolan reaction, for example, the reaction of silica oxides with calcium hydroxide during the hydration process. The biowaste ash may react, for example, with excess hydrated lime present in the cement composition during hydration. In addition, hydrated lime may be added to the cement composition, for example, to provide sufficient calcium ions for the biowaste ash to set.

Any biowaste that can be burned to produce ash that may be useful in cementing may be suitable for use in embodiments of the present invention. Examples of suitable biowaste ash that may be suitable for use include, for example, agricultural waste ash, municipal waste ash, waste-water treatment waste ash, animal waste ash, non-human-non-animal industrial waste ash, and combinations thereof. The agricultural waste ash, municipal waste ash and industrial waste ash may also include ash that is derived from agricultural, municipal or industrial materials that have viable other uses and are not necessarily considered to be a waste products. The biowaste ash may also be generated, for example, as a byproduct of combustion for heat and/or power generation. Examples of agricultural waste ash that may be used in embodiments of the present invention include, for example, wood (e.g., sawdust, bark, twigs, branches, other waste wood) ash, tree leave ash, corn cob ash, cane (e.g., sugar cane) ash, bagasse ash, grain (e.g., amaranth, barley, corn flaxseed, millet, oat, quinoa, rye, wheat etc.) and related by-product(s) (e.g., husks, hulls, etc.) ash, orchard ash, vine trimming ash, grass (e.g., Korai, Tifton, native shiba, etc.) ash, straw ash, ground nut shell ash, legume (e.g., soybean) ash, and combinations thereof. As defined herein, "agricultural waste ash" and "grain related by-product ash" do not include rice hull ash. Municipal waste ashes that may be useful in embodiments of the present invention include municipal solid waste ashes and municipal sewage waste ashes, including, for example, human biowaste ash, food waste ash, household scrap ash, sanitary paper product ash, and ashes of other biological components. Municipal sewage waste also may comprise mineral matter and small amounts of chemical products that can be introduced, for example, into the waste stream through a municipal sewer system. Animal waste ashes that may be used in embodiments of the present invention include, for example, ashes derived from burning manure and other animal wastes that may be generated at sites where animals are raised or housed. Other biowaste ashes, such as non-human-non-animal industrial waste ashes, that may be used in embodiments of the present invention include, for example, ashes derived from pulp and paper mill sludges, waste oil products including greases and solids, and wastes that include organic debris dredged from harbors or estuaries.

Burn duration and burn temperature, for example, may impact the composition of the ash obtained from the biowaste. The burn temperature, as used herein, refers to the temperature at which the biowaste is exposed during the burning and not to the temperature of the biowaste itself. It should be understood that the biowaste may be burned at a wide variety of times and temperatures to produce ash suitable for use in embodiments of the present invention. By way of example, the biowaste may be burned for about 2 hours to about 8 hours and, alternatively, for about 3 hours to about 6 hours. In certain embodiments, the biowaste may be burned for about 5 hours. By way of further example, the ash may be burned at a temperature of about 400° C. to about 900° C. and, alternatively, of about 500° C. to about 700° C. In certain embodiments, the ash may be burned at a temperature of about 600° C. It should be understand that burn times and burn temperatures outside those listed in this disclosure may also be suitable for embodiments of the present invention.

In general, the biowaste ash may be included in embodiments of the cement compositions in an amount sufficient for a particular application. In some embodiments, the biowaste ash may be present in an amount of about 0.1% to about 75% bwoc. In some embodiments, the biowaste ash may be present in an amount about 1% to about 50% bwoc. In some embodiments, the biowaste ash may be present in an amount about 1% to about 25% bwoc.

As previously mentioned, embodiments of the cement compositions of the present invention may further comprise CKD, fly ash, a natural pozzolan, metakaolin, shale, slag, zeolite, and combinations thereof. In addition, hydrated lime may also be included in embodiments of the cement compositions. Each of these additional additives will be described in more detail in the following paragraphs.

CKD may be included in embodiments of the cement compositions of the present invention. Where present, the CKD may be included in the cement compositions in an amount sufficient to provide, for example, the desired compressive strength, density, and/or cost reduction. In some embodiments, the CKD may be present in the cement compositions of the present invention in an amount of about 0.1% to about 99% bwoc. In some embodiments, the CKD may be present in the cement compositions of the present invention in an amount of about 1% to about 50% bwoc. One of ordinary skill in the art, with the benefit of this disclosure, will recognize the appropriate amount of the CKD to include for a chosen application.

A natural pozzolan may be included in embodiments of the cement compositions of the present invention. Natural pozzolans are generally present on the Earth's surface and should set and harden in the presence of hydrated lime and water. Examples of natural pozzolans include pumicite, diatomaceous earth, volcanic ash, opaline shale, tuff, and combinations thereof. Generally, pumicite is a volcanic rock that exhibits cementitious properties, in that it may set and harden in the presence of hydrated lime and water. Hydrated lime may be used in combination with pumicite, for example, to provide sufficient calcium ions for pumicite to set. The natural pozzolan may be used, among other things, to replace higher cost cementitious components, such as Portland cement, in embodiments of the cement compositions, resulting in more economical cement compositions. In some embodiments, the natural pozzolan may be present in an amount of about 0.1% to about 50% bwoc. In some embodiments, the natural pozzolan may be present in an amount of about 1% to about 25% bwoc. One of ordinary skill in the art, with the benefit of this disclosure, will recognize the appropriate amount of the natural pozzolan to include for a chosen application.

Metakaolin may be included in embodiments of the cement compositions of the present invention includes metakaolin. Generally, metakaolin is a white pozzolan that may be prepared by heating kaolin clay, for example, to temperatures of about 600° to about 800° C. In some embodiments, the metakaolin may be present in the cement compositions of the present invention in an amount of about 0.1% to about 50% bwoc. In some embodiments, the metakaolin may be present in an amount of about 1% to about 25% bwoc. One of ordinary skill in the art, with the benefit of this disclosure, will recognize the appropriate amount of the metakaolin to include for a chosen application.

Shale may be included in embodiments of the cement compositions of the present invention. Among other things, shale included in the cement compositions may react with excess hydrated lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are available from TXI Energy Services, Inc., Houston, Tex. Generally, the shale may have any particle size distribution as desired for a particular application. In certain embodiments, the shale may have a particle size distribution of about 37 micrometers to about 4,750 micrometers. Where present, the shale may be included in embodiments of the cement compositions of the present invention in an amount sufficient to provide, for example, the desired compressive strength, density, and/or cost. In some embodiments, the shale may be present in an amount of about 0.1% to about 50% bwoc. In some embodiments, the shale may be present in an amount of about 1% to about 25% bwoc. One of ordinary skill in the art, with the benefit of this disclosure, will recognize the appropriate amount of the shale to include for a chosen application.

Zeolite may be included in embodiments of the cement compositions of the present invention. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Pat. No. 7,445,669, the entire disclosure of which is incorporated herein by reference. An example of a suitable source of zeolite is available from the C2C Zeolite Corporation of Calgary, Canada. In some embodiments, the zeolite may be present in the cement compositions of the present invention in an amount of about 0.1% to about 50% bwoc. In certain embodiments, the zeolite may be present in an amount of about 1% to about 25% bwoc. One of ordinary skill in the art, with the benefit of this disclosure, will recognize the appropriate amount of the zeolite to include for a chosen application.

Lime may be included in embodiments of the cement compositions of the present invention. In certain embodiments, the lime may be hydrated lime. In certain embodiments, the lime present in the cement composition may comprise, for example, a combination of unhydrated and hydrated lime. Where present, the lime may be present in the cement compositions in an amount of about 0.1% to about 40% bwoc. In some embodiments, the lime may be present in the cement compositions in an amount of about 1% to about 20% bwoc. One of ordinary skill in the art, with the benefit of this disclosure, will recognize the appropriate amount of the lime to include for a chosen application.

As mentioned above, embodiments of the cement compositions of the present invention may be foamed, for example, further comprising a gas and a surfactant, in accordance with embodiments of the present invention. A foamed cement composition may be used, for example, where it is desired for the cement composition to be lightweight. For example, a foamed cement composition of the present invention may comprise hydraulic cement, biowaste ash, a gas, a surfactant, and water. Other suitable additives, such as those discussed herein, also may be included in embodiments of the foamed cement compositions of the present invention as desired by those of ordinary skill in the art, with the benefit of this disclosure.

The gas used in embodiments of the foamed cement compositions may be any gas suitable for foaming a cement composition, including, but not limited to, air, nitrogen, or combinations thereof. Generally, the gas may be present in embodiments of the foamed cement compositions of the present invention in an amount sufficient to form the desired foam. In certain embodiments, the gas may be present in the foamed cement compositions of the present invention in an amount of about 10% to about 80% by volume of the composition.

Where foamed, embodiments of the cement compositions further may comprise a surfactant. In some embodiments, the surfactant comprises a foaming and stabilizing surfactant composition. As used herein, a "foaming and stabilizing surfactant composition" refers to a composition that comprises one or more surfactants and, among other things, may be used to facilitate the foaming of a cement composition and also may stabilize the resultant foamed cement composition formed therewith. Any suitable foaming and stabilizing surfactant composition may be used in the cement compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is ZONESEAL® 2000 foaming additive, available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference. Generally, the surfactant may be present in the foamed cement compositions of the present invention in an amount sufficient to provide a suitable foam. In some embodiments, the surfactant may be present in an amount of about 0.8% and about 5% by volume of the water ("bvow").

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, thixotropic additives, oil-swellable materials, water-swellable materials, and combinations thereof. Specific examples of these, and other, additives include crystalline silica, amorphous silica, fumed silica, salts, fibers, hydratable clays, calcined shale, microspheres, pumicite, diatomaceous earth, elastomers, resins, latex, combinations thereof, and the like. A person having ordinary skill in the art, with the benefit of this disclosure, will readily be able to determine the type and amount of additive useful for a particular application and desired result.

Embodiments of the cement compositions of the present invention may be used in a variety of subterranean applications where cement compositions may be used, including, but not limited to, primary cementing, remedial cementing, and drilling operations. An example of a method of the present invention may comprise introducing a cement composition hydraulic cement, water, and biowaste ash into a subterranean formation; and allowing the cement composition to set in the subterranean formation. As desired by one of ordinary skill in the art, with the benefit of this disclosure, embodiments of the cement compositions of the present invention useful in this method may comprise any of the above-listed additives, as well any of a variety of other additives suitable for use in subterranean application. In example primary cementing embodiments, a cement composition may be introduced into a space between a subterranean formation and a conduit (e.g., casing, expandable casing, liners, etc.) located in the subterranean formation. The cement composition may be allowed to set to form a hardened mass in the space between the subterranean formation and the conduit. In addition, in example remedial cementing embodiments, a cement composition may used, for example, in squeeze cementing operations or in the placement of cement plugs.

Another example of a method of the present invention is a method of cementing that may comprise introducing a lightweight cement composition into a subterranean formation. Embodiments of the lightweight cement composition have a density of less than about 13 lb/gal and may comprise hydraulic cement, water, biowaste ash, and a lightweight additive (e.g., bentonite, gilsonite, expanded perlite, microspheres, etc.). The method further may comprise allowing the lightweight cement composition to set in the subterranean formation. As desired by one of ordinary skill in the art, with the benefit of this disclosure, embodiments of the lightweight cement compositions of the present invention useful in this method may comprise any of the above-listed additives, as well any of a variety of other additives suitable for use in subterranean applications.

Another example of a method of the present invention is a method of cementing that may comprise introducing a foamed cement composition that comprises hydraulic cement, water, biowaste ash, a gas, and a surfactant into a subterranean formation. The method further may comprise allowing the foamed cement composition to set in the subterranean formation. As desired by one of ordinary skill in the art, with the benefit of this disclosure, embodiments of the foamed cement compositions of the present invention useful in this method may comprise any of the above-listed additives, as well any of a variety of other additives suitable for use in subterranean applications.

Another example of a method of the present invention is a method of cementing a conduit (e.g., casing, expandable casing, liners, etc.) disposed in a subterranean formation. An example of such a method may comprise introducing a cement composition comprising hydraulic cement, water, and biowaste ash into the annulus between the conduit and the subterranean formation; and allowing the settable composition to set in the annulus to form a hardened mass. Generally, in most instances, the hardened mass should fix the conduit in the formation. The method further may comprise, for example, introducing the conduit into the subterranean formation. As desired by one of ordinary skill in the art, with the benefit of this disclosure, embodiments of the cement compositions of the present invention useful in this method may comprise any of the above-listed additives, as well any of a variety of other additives suitable for use in subterranean applications.

Another example of a method of the present invention is a method of sealing a portion of a gravel pack or a portion of a subterranean formation. An example of such a method may comprise introducing a cement composition comprising hydraulic cement, water, and biowaste ash into the portion of the gravel pack or the portion of the subterranean formation; and allowing the cement composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack may include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. As desired by one of ordinary skill in the art, with the benefit of this disclosure, embodiments of the cement compositions of the present invention useful in this method may comprise any of the above-listed additives, as well any of a variety of other additives suitable for use in subterranean applications.

Another example of a method of the present invention is a method of sealing voids located in a conduit (e.g., casing, expandable casings, liners, etc.) or in a cement sheath. Generally, the conduit may be disposed in a wellbore, and the cement sheath may be located in the annulus between the conduit and a subterranean formation. An example of such a method may comprise introducing a composition comprising hydraulic cement, water, and biowaste ash into the void; and allowing the cement composition to set to form a hardened mass in the void. As desired by one of ordinary skill in the art, with the benefit of this disclosure, embodiments of compositions of the present invention useful in this method may comprise any of the above-listed additives, as well any of a variety of other additives suitable for use in subterranean applications.

When sealing a void in a conduit, embodiments of the methods of the present invention, in some embodiments, further may comprise locating the void in the conduit; and isolating the void by defining a space within the conduit in communication with the void, wherein the settable composition may be introduced into the void from the space. The void may be isolated using any suitable technique and/or apparatus, including bridge plugs, packers, and the like. The void in the conduit may be located using any suitable technique. When sealing a void in the cement sheath, the methods of the present invention, in some embodiments, further may comprise locating the void in the cement sheath; producing a perforation in the conduit that intersects the void; and isolating the void by defining a space within the conduit in communication with the void via the perforation, wherein the cement composition is introduced into the void via the perforation. The void in the conduit may be located using any suitable technique. The perforation may be created in the conduit using any suitable technique, for example, perforating guns. The void may be isolated using any suitable technique and/or apparatus, including bridge plugs, packers, and the like.

Another example of a method of the present invention is a method of forming a plug in a well bore. An example of such a method may include introducing a introducing a cement composition comprising hydraulic cement, water, and biowaste ash into the well bore at a location in the well bore; and allowing the cement composition to set to form the plug in the well bore. The plug may be found, for example, when plugging and abandoning the well or to form a kickoff plug when changing the direction of drilling the well bore. An example of changing the direction of drilling a well bore may comprise introducing a cement composition comprising hydraulic cement, water, and biowaste ash into the well bore at a location in the well bore wherein the direction of drilling is to be changed; allowing the cement composition to set to form a kickoff plug in the well bore; drilling a hole in the kickoff plug; and drilling of the well bore through the hole in the kickoff plug. As desired by one of ordinary skill in the art, with the benefit of this disclosure, embodiments of the cement compositions of the present invention useful in this method further may comprise any of the above-listed additives, as well any of a variety of other additives suitable for use in subterranean applications.

Generally, the drilling operation may continue, for example, in the direction of the hole drilled through the kickoff plug. The well bore and hole in the kickoff plug may be drilled using any suitable technique, including rotary drilling, cable tool drilling, and the like. In some embodiments, one or more oriented directional drilling tools may be placed adjacent to the kickoff plug. Suitable directional drilling tools include, but are not limited to, whip-stocks, bent sub-downhole motorized drill combinations, and the like. The direction drilling tools then may be used to drill the hole in the kickoff plug so that the hole is positioned in the desired direction. Optionally, the directional drilling tool may be removed from the well bore subsequent to drilling the hole in the kickoff plug.

In accordance with embodiments of the present composition, the cement compositions of the present invention may utilize a packing volume fraction suitable for a particular application as desired. As used herein, the term "packing volume fraction" refers to the volume of the particulate materials in a fluid divided by the total volume of the fluid. The size ranges of the preferred particulate materials may be selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

Embodiments of the present invention may include a combination of at least three features to obtain a maximum packing volume. One is the use of at least three particulate materials wherein the alt least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. Another aspect of embodiments of the present invention present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. In accordance with embodiments of the present invention, biowaste ash may be used to obtain a maximum packing volume fraction. By way of example, biowaste ash having a particle size of about 7 nm to about 1 millimeter may be used to obtain a maximum packing volume fraction. Packing volume fraction is described in further detail in U.S. Pat. No. 5,518,996 and U.S. Pat. No. 7,213,646, the entire disclosures of which are incorporated herein by reference.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially" of or "consist of" the various components and steps. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A subterranean formation cementing composition comprising:
    Portland cement;
    water in an amount sufficient to form a pumpable slurry;
    biowaste ash, wherein the biowaste ash does not include fly ash or rice hull ash, wherein the biowaste ash has been burned in a range of from about 2 hours to about 8 hours at a temperature in a range of from about 500° C. to about 700° C., and wherein the biowaste ash is present in the subterranean formation cement composition in an amount of about 1% to about 25% by weight of the Portland cement;
    at least one component selected from the group consisting of cement kiln dust, a natural pozzolan, metakaolin, shale, slag, zeolite, and combinations thereof; and
    at least one additive selected from the group consisting of a strength-retrogression additive, a set accelerator, a set retarder, a weighting agent, a lightweight additive, a gas-generating additive, a mechanical-property-enhancing additive, a lost-circulation material, a filtration-control additive, a dispersant, a fluid loss control additive, a defoaming agent, a foaming agent, a thixotropic additive, an oil-swellable material, a water-swellable material, and combinations thereof;
    wherein the subterranean formation cement composition has a density of less than about 13 pounds per gallon.

2. The composition of claim 1 wherein the biowaste ash comprises at least one biowaste ash selected from the group consisting of, municipal waste ash, waste-water treatment waste ash, animal waste ash, non-human, non-animal industrial waste ash, and combinations thereof.

3. The composition of claim 1 wherein the biowaste ash comprises agricultural waste ash.

4. The composition of claim 1 wherein the biowaste ash comprises at least one agricultural waste ash selected from the group consisting of wood ash, tree leave ash, corn cob ash, cane ash, bagasse ash, grain ash, grain related by-product ash, orchard ash, vine trimming ash, grass ash, straw ash, ground nut shell ash, legume ash, and combinations thereof.

5. The composition of claim 1 wherein the biowaste ash comprises municipal waste ash.

6. The composition of claim 1 wherein the biowaste ash comprises municipal solid waste ash.

7. The composition of claim 1 wherein the subterranean formation cement composition further comprises at least one additive selected from the group consisting of a crystalline silica, amorphous silica, fumed silica, a salt, fiber, hydratable clay, calcined shale, a microsphere, pumicite, diatomaceous earth, an elastomer, a resin, latex, and combinations thereof.

8. The composition of claim 1 wherein the subterranean foil ration cement composition is a foamed cement composition further comprising a gas and a surfactant.

9. The composition of claim 1 further comprising maximizing a packing volume in the subterranean formation cement composition using at least one particulate material with a particle size of about 7 nanometers to about 1 millimeter, wherein the at least one particulate material comprises the biowaste ash.

10. A cement composition comprising:
hydraulic cement comprising at least one cement selected from the group consisting of a Portland cement, a pozzolana cement, a gypsum cement, a high-alumina-content cement, a slag cement, a silica cement, and combinations thereof, and wherein the hydraulic cement is present in the cement composition an amount of about 1% to about 75% by weight of the hydraulic cement;
water in an amount sufficient to form a pumpable slurry, wherein the water is present in an amount in a range of from about 40% to about 200% by weight of the hydraulic cement;
biowaste ash comprising municipal waste ash, wherein the biowaste ash does not include fly ash or rice hull ash, wherein the biowaste ash has been burned in a range of from about 2 hours to about 8 hours at a temperature in a range of from about 500° C. to about 700° C., and wherein the biowaste ash is present in the cement composition in an amount of about 1% to about 25% by weight of the hydraulic cement; and
at least one additive selected from the group consisting of cement kiln dust, a natural pozzalon, metakaolin, shale, slag, zeolite, and combinations thereof;
wherein the cement composition has a density of about 8 pounds per gallon to about 17 pounds per gallon.

11. The composition of claim 10 wherein the cement composition further comprises at least one additive selected from the group consisting of a strength-retrogression additive, a set accelerator, a set retarder, a weighting agent, a lightweight additive, a gas-generating additive, a mechanical-property-enhancing additive, a lost-circulation material, a filtration-control additive, a dispersant, a fluid loss control additive, a defoaming agent, a foaming agent, a thixotropic additive, an oil-swellable material, a water-swellable material, and combinations thereof.

12. The composition of claim 10 wherein the cement composition further comprises at least one additive selected from the group consisting of a crystalline silica, amorphous silica, fumed silica, a salt, fiber, hydratable clay, a microsphere, pumicite, diatomaceous earth, an elastomer, a resin, latex, combinations thereof.

13. The composition of claim 10 wherein the cement composition is a foamed cement composition further comprising a gas and a surfactant.

14. The composition of claim 10 further comprising maximizing a packing volume in the cement composition using at least one particulate material with a particle size of about 7 nanometers to about 1 millimeter, wherein the at least one particulate material comprises the biowaste ash.

15. The composition of claim 10 wherein the natural pozzolan is pumicite.

16. A composition comprising:
cement kiln dust;
water in an amount in a range of from about 40% to about 200% by weight of the cement kiln dust; and
municipal solid waste ash, wherein the municipal solid waste ash does not include fly ash or rice hull ash, wherein the municipal solid waste ash has been burned in a range of from about 3 hours to about 6 hours at a temperature in a range of from about 500° C. to about 700° C., and wherein the municipal solid waste ash is present in the composition in an amount of about 1% to about 25% by weight of the cement kiln dust;
wherein the composition has a density of less than about 13 pounds per gallon.

17. The composition of claim 16 wherein the composition further comprises at least one component selected from the group consisting of, a natural pozzolan, metakaolin, shale, slag, zeolite, and combinations thereof.

18. The composition of claim 16 wherein the composition further comprises at least one additive selected from the group consisting of a crystalline silica, amorphous silica, fumed silica, a salt, fiber, hydratable clay, calcined shale, a microsphere, pumicite, diatomaceous earth, an elastomer, a resin, latex, and combinations thereof.

19. The composition of claim 16 wherein the composition further comprises at least one additive selected from the group consisting of a strength-retrogression additive, a set accelerator, a set retarder, a weighting agent, a lightweight additive, a gas-generating additive, a mechanical-property-enhancing additive, a lost-circulation material, a filtration-control additive, a dispersant, a fluid loss control additive, a defoaming agent, a foaming agent, a thixotropic additive, an oil-swellable material, a water-swellable material, and combinations thereof.

* * * * *

UNITED STATES PATENT AND TRADEMARK OFFICE
CERTIFICATE OF CORRECTION

| | | |
|---|---|---|
| PATENT NO. | : 8,641,818 B2 | |
| APPLICATION NO. | : 13/418220 | |
| DATED | : February 4, 2014 | |
| INVENTOR(S) | : Craig W. Roddy et al. | |

It is certified that error appears in the above-identified patent and that said Letters Patent is hereby corrected as shown below:

Title Page, Item [74], "Attorney, Agent, or Firm – Craig W. Roddy; Turney L.L.P." should read
– Attorney, Agent or Firm – Craig W. Roddy; Tumey L.L.P. –

Signed and Sealed this
Twenty-ninth Day of April, 2014

Michelle K. Lee
*Deputy Director of the United States Patent and Trademark Office*